United States Patent [19]

Puskas

[11] Patent Number: 4,557,439
[45] Date of Patent: Dec. 10, 1985

[54] INFLATABLE AIRFOIL CANOPY LAUNCHING METHOD AND APPARATUS

[75] Inventor: Elek Puskas, Mt. Holly, N.J.

[73] Assignee: Para-Flite, Inc., N.J.

[21] Appl. No.: 315,475

[22] Filed: Oct. 27, 1981

[51] Int. Cl.[4] .............................................. B64F 1/10
[52] U.S. Cl. ................................. 244/63; 244/1 TD; 244/151 B; 244/152; 244/DIG. 1.3
[58] Field of Search ................... 244/1 TD, 3, 63, 142, 244/147, 149, 151 R, 151 B, 152, 153 R, 155 R, 155 A, DIG. 1.2, DIG. 1.3; 114/253, 254

[56] References Cited

U.S. PATENT DOCUMENTS

| | | | |
|---|---|---|---|
| 2,612,327 | 9/1952 | Carlson | 244/3 |
| 2,943,591 | 7/1960 | Schneider | 114/253 |
| 3,017,138 | 1/1962 | Flint | 244/3 |
| 3,740,008 | 6/1973 | Grauel | 244/153 R |
| 3,806,071 | 4/1974 | Brown | 244/153 R |
| 3,987,746 | 10/1976 | McCulloh | 244/155 A |
| 4,248,394 | 2/1981 | Klumpp | 244/3 |

FOREIGN PATENT DOCUMENTS 1270654  7/1961  France ................................ 244/142

OTHER PUBLICATIONS

"Tower Hobbies", Jul. 1980, pp. 4, 123, 337.
Tower Hobbies "Tower Talk", advertisement for RLF H.D. Hi-Start, p. 2, Issue #3, 1983.

Primary Examiner—Galen L. Barefoot
Assistant Examiner—Rodney Corl
Attorney, Agent, or Firm—Harvey B. Jacobson

[57] ABSTRACT

Lateral forces exerted on an air inflated, airfoil canopy of an aerial device during towline launching are balanced by slidable displacement of the coupling between the towline and a flexible guide attached at spaced locations to the aerial device. The flexible guide has a triangular configuration to control the distribution of towing force components and corresponding changes in orientation of the aerial device.

6 Claims, 6 Drawing Figures

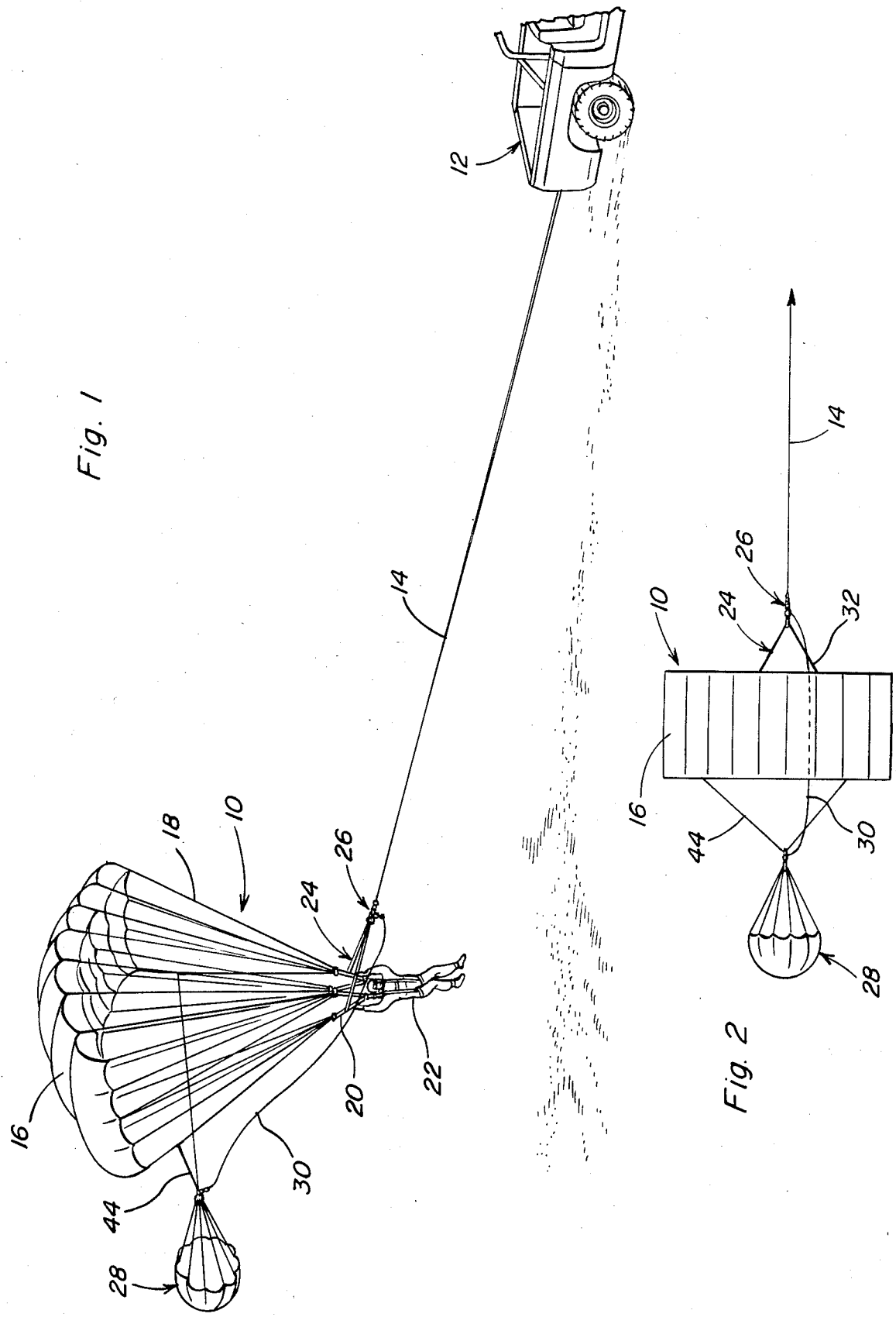

INFLATABLE AIRFOIL CANOPY LAUNCHING METHOD AND APPARATUS

BACKGROUND OF THE INVENTION

This invention relates to towline launching of aerial devices.

Aerial devices of the type having an air inflated, forward glide canopy such as disclosed in U.S. Pat. No. 3,724,789 to Snyder are often launched to an airborne state through a towing vehicle and towline for testing purposes or for recreational sport. Wind and other unexpected unstabilizing weather conditions will sometimes prevent successful launching by exerting lateral forces on the canopy. Present launching equipment are unable to adequately cope with such launching problems.

It is therefore an important object to provide a novel towline launching arrangement for aerial devices of the foregoing type which will automatically compensate for launch disturbing forces exerted on the canopy of the aerial device.

SUMMARY OF THE INVENTION

In accordance with the present invention, a towline is slidably coupled at a forward movable location to a front flexible guide element attached at spanwise spaced anchoring locations to the payload suspending harness of the aerial device being launched. The aerial device includes a canopy of the type aforementioned having outer surface portions extending chordwise between leading and trailing edges and maintained inflated in an airfoil shape by pressurization of air cells open at the leading edge for intake of air. The flexible guide element forms a triangular configuration between the anchoring and movable locations in order to control distribution of towing force components applied to and automatic changes in orientation of the canopy to compensate for lateral forces exerted on the aerial device. The compensating action of the front flexible guide element is enhanced by a trailing drogue chute coupled to the aerial device through a flexible element for flight path correction.

When launching of the aerial device is completed, both the towline and drogue chute may be selectively disconnected. The towline is interconnected with the drogue chute by a slack line so that it may be safely lowered to the ground by the disconnected drogue chute acting as a parachute.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing the launching operation in accordance with the present invention.

FIG. 2 is a simplified top plan view of the launching arrangement shown in FIG. 1.

DETAILED DESCRIPTION OF PREFERRED EMBODIMENT

Figure 3:
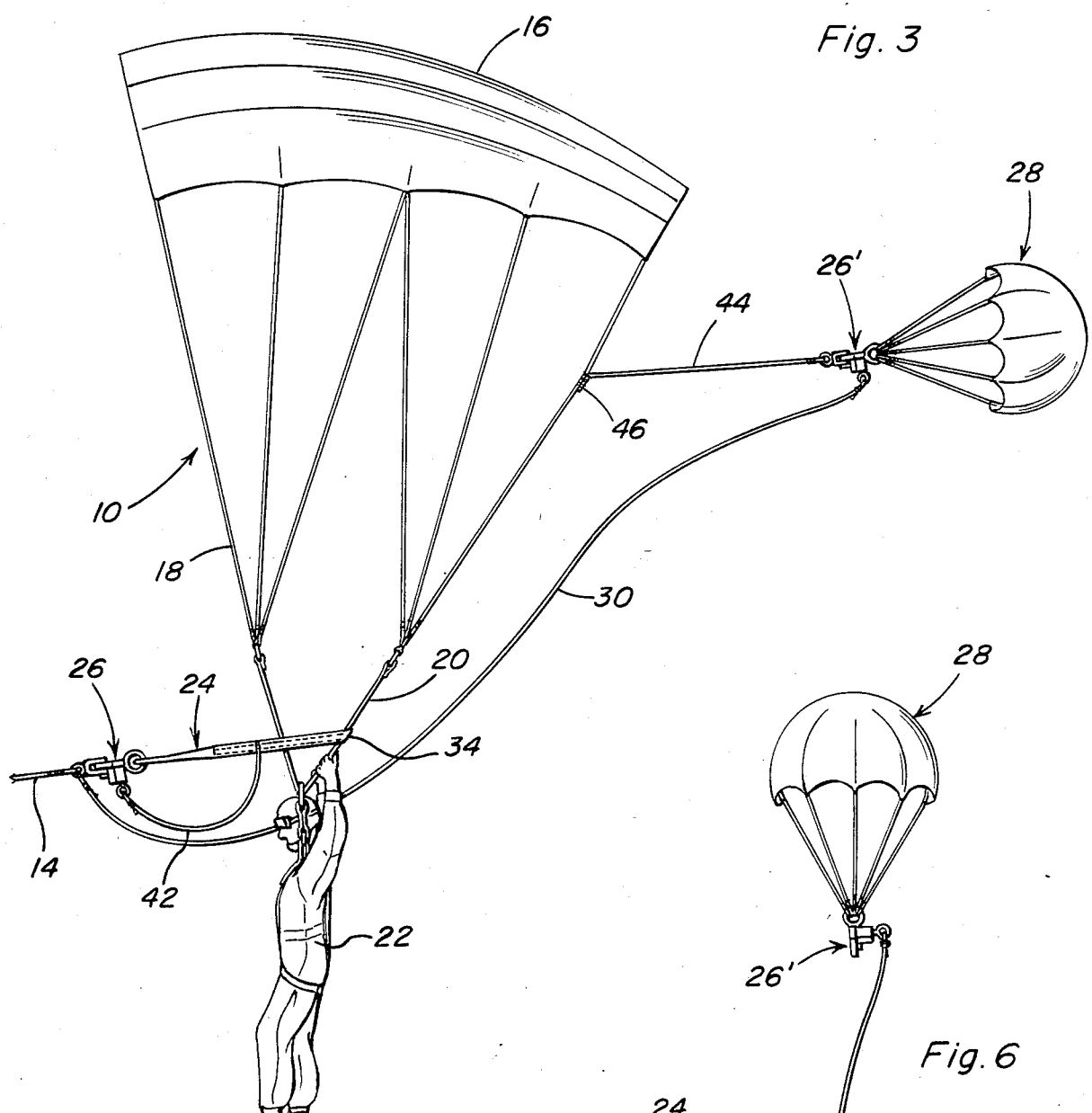
FIG. 3 is a side elevation view of an aerial device during the launching operation shown in FIG. 1.

Referring now to the drawings in detail, FIG. 1 illustrates an aerial device 10 being launched by connection to a towing vehicle 12 through a towline or rope 14. The aerial device is in the form of a forward glide-type of parachute of the aforementioned type having an air inflated, airfoil-shaped canopy 16 attached by suspension lines 18 to a payload harness 20. The payload is a chutist 22 secured to the harness. Once the canopy is inflated by forward motion of the chutist, sufficient to lift the chutist off the ground, forward motion of the aerial device 10 is continued by the towing force applied thereto through the towline 14 by the vehicle 12. As soon as the canopy 16 is fully inflated and rises under lift forces a substantial distance above ground, the towline is disconnected from the vehicle 12 in any suitable manner well known in the art, and from the aerial device as will be hereinafter explained to complete the launching operation.

During the launching operation while the towline is under tension transmitting a towing force to the aerial device 10, the canopy 16 may be subjected to lateral forces applied in directions transverse to the towline. Unless balanced or removed by reorientation of the aerial device, such lateral forces may disturb the launching operation by preventing the aerial device from ascending. The present invention provides means for balancing or compensating for such lateral forces by coupling the towline 14 to the aerial device through a guide attachment 24 and a slide assembly 26. Also provided is a drogue chute 28 attached to spaced suspension lines in trailing relation to the canopy. A slack cable 30 interconnects the drogue chute and the end of the towline 14 as shown in FIGS. 1 and 2.

Figure 4:
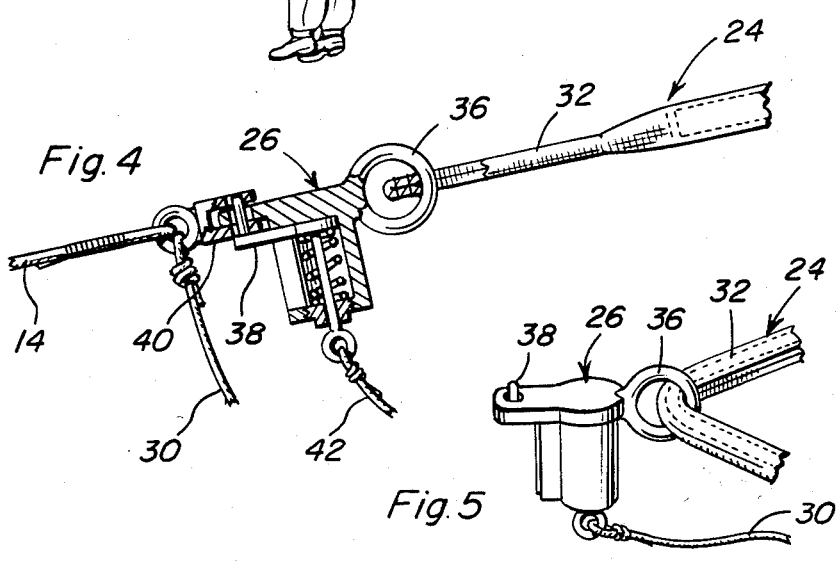
FIG. 4 is an enlarged partial side elevation view, with parts broken away and shown in section, of a portion of the apparatus shown in FIG. 3.
Figure 5:
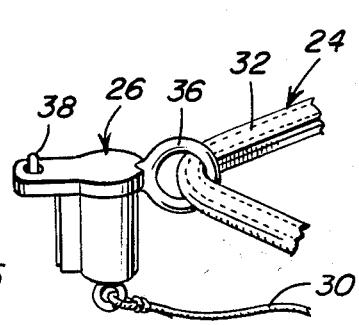
FIG. 5 is a perspective view of the hardware shown in FIG. 4 disconnected from the towline.

As more clearly seen in FIGS. 3, 4 and 5, the guide attachment is a flexible element 32 made of heavy fabric, for example, attached at spanwise spaced anchoring locations 34 to the harness of the aerial device. The flexible element slidably extends through a ring formation 36 of the slide assembly 26, the body of which mounts a releasable latch element 38 that interconnects the slide assembly with a terminal ring element 40 of the towline 14, to which the cable 30 is connected. The latch element 38 is retracted against a spring bias by means of an actuating cable 42 anchored to the guide attachment within easy reach of the chutist 22. Thus, when the launching operation is completed and the chutist is airborne, a pull exerted on actuating cable 42 will retract the latch element 38 to disconnect the towline 14 from the slide assembly. The aerial device 10 will then be free of the towline which may then drop to the ground.

Figure 6:
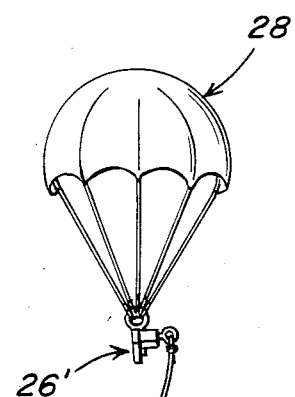
FIG. 6 is a side elevation view of a portion of the launching apparatus after the launching operation is completed.

When the towing line 14 is disconnected and drops toward the ground, it exerts a pull through cable 30 on the latch element of a releasable coupling component 26' similar to the slide assembly 26. The component 26' couples the drogue chute 28 to the canopy through a flexible element 44 attached at spaced locations 46 to the suspension lines 18 of the aerial device. Upon disconnection of component 26' from the flexible element 44, the drogue chute 28 may act as a safety lowering parachute for the disconnected towline 14 to which it remains connected by cable 30, as shown in FIG. 6.

As more clearly seen in FIG. 2, during the launching operation, the flexible elements 32 and 44 form isosceles triangles through which forces transferred to the aerial device from the towline 14 and drogue chute 28 are symmetrically distributed at the anchoring locations 34 and 46. Such forces will, however, be unbalanced by lateral forces exerted on the canopy 16 of the aerial device causing slidable spanwise displacement of the movable location established by ring 36 at which the towline is coupled to the flexible guide 24 and a force imbalance at location 46 at which the flexible element 44 is connected. The lateral forces are thereby compensated for and balanced by spatial reorientation of the aerial device restoring the symmetrical distribution of force components transferred thereto by the towline and drogue chute as shown in FIG. 2.

Although certain specific hardware was heretofore described in connection with the slidable and disconnectable couplings between the towline 14 and flexible guide 24 and between drogue chute 28 and flexible element 44, it should be appreciated that many other equivalent mechanical arrangements may be utilized. Insofar as the drogue chute 28 is concerned, it serves the dual functions of (1) spatially reorientating the canopy to correct for any flight path disturbance and (2) lowering the disconnected towline 14 in a safe manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a wheeled, ground towing vehicle, an aerial device having a launch assisting drogue chute connected thereto and apparatus for launching the aerial device, including a towline connecting the vehicle to the aerial device, the improvement comprising means for selectively disconnecting the towline from the vehicle and the drogue chute from the aerial device after launching thereof, and means for suspending the disconnected towline from the disconnected drogue chute acting as a payload parachute, including means coupling the drogue to the aerial device for correction of flight path disturbances caused by lateral forces acting thereon in directions transverse to the towline during launching of the aerial device.

2. In combination with a towing vehicle and an aerial device having an airfoil-shaped canopy, a payload harness, and suspension lines connecting the canopy to the harness, apparatus for launching said aerial device, including a towline connected to the vehicle, means coupling the towline to the aerial device, a drogue chute, means coupling the drogue chute to the aerial device in trailing relation for correction of flight path disturbances caused by lateral forces acting on the canopy in directions transverse to the towline during launching of the aerial device, means for selectively disconnecting the towline and the drogue chute from the aerial device after launching thereof, and means for suspending the disconnected towline from the disconnected drogue chute acting as a payload lowering parachute.

3. The combination of claim 2 wherein said first recited coupling means includes a guide attachment connected at spaced anchoring locations to the aerial device, and slide means coupling the towline to the guide attachment at a movable location for displacement by lateral forces acting on the aerial device in directions transverse to the towline to maintain substantially symmetrical distribution of towing force components transferred from the towline to said anchoring locations on the aerial device through the guide attachment.

4. The apparatus as defined in claim 1 wherein said guide attachment comprises a flexible element forming a triangular configuration between said anchoring locations and said movable location during the transfer of the towing force components.

5. The apparatus as defined in claim 4 wherein said triangular configuration is substantially isosceles during the transfer of the towing force components in the absence of unbalanced lateral forces acting on the aerial device.

6. Apparatus for launching an aerial device, including a towline, a flexible guide attached at spaced anchoring locations to the aerial device, and force compensating means coupling the towline to the guide for slidable displacement thereon in response to lateral forces acting on the aerial device in directions transverse to the towline under tension during transfer of towing forces to the aerial device, said flexible guide forming an isosceles triangular configuration between the anchoring locations and the force compensating means for symmetrical distribution of the towing forces from the towing line to said anchoring locations on the aerial device, drogue chute means connected in trailing relation to the aerial device to enhance compensation for the lateral forces by said slidable displacement of the force compensating means, means for selectively disconnecting the towline and the drogue chute means from the aerial device after launching thereof, and means for suspending the disconnected towline from the disconnected drogue chute means acting as a payload lowering parachute.

* * * * *